United States Patent [19]

Unterforsthuber et al.

[11] Patent Number: 5,003,887
[45] Date of Patent: Apr. 2, 1991

[54] GAS GENERATOR FOR INFLATING AN INFLATABLE ARTICLE

[75] Inventors: Karl Unterforsthuber, Oberhaching; Rudolf Koenig, Bruckmuehl, both of Fed. Rep. of Germany

[73] Assignee: Bayern-Chemie Gesellschaft fuer flugchemische Antriebe mbH, Aschau am Inn, Fed. Rep. of Germany

[21] Appl. No.: 450,850

[22] Filed: Dec. 13, 1989

[30] Foreign Application Priority Data

Dec. 15, 1988 [DE] Fed. Rep. of Germany ....... 3842145

[51] Int. Cl.⁵ ............................................. B60R 21/26
[52] U.S. Cl. ...................................... 102/531; 137/79; 251/11; 441/41; 236/93 R; 280/742
[58] Field of Search ............................ 251/11; 137/79; 280/734, 735, 736, 737, 740, 741, 742, 728; 102/530, 531; 222/3, 54; 441/41, 98, 96; 422/164, 165, 166; 236/93 R

[56] References Cited

U.S. PATENT DOCUMENTS

| | | | |
|---|---|---|---|
| 2,244,808 | 6/1941 | Scott et al. | 236/93 R |
| 3,324,656 | 6/1967 | Bradshaw, Jr. | 137/79 |
| 3,767,228 | 10/1973 | Lewis | 280/735 |
| 3,773,352 | 11/1973 | Radke | 280/735 |
| 3,897,962 | 8/1975 | Sack | 280/742 |
| 4,026,580 | 5/1977 | Wulf et al. | 280/742 |
| 4,380,346 | 4/1983 | Davis et al. | 422/166 |
| 4,726,452 | 2/1988 | Ty et al. | 236/93 R |

FOREIGN PATENT DOCUMENTS 2915202 10/1980 Fed. Rep. of Germany .

Primary Examiner—Richard A. Bertsch
Assistant Examiner—Karin Tyson
Attorney, Agent, or Firm—W. G. Fasse; D. H. Kane, Jr.

[57] ABSTRACT

A gas generator for inflating an inflatable article such as a safety bag or raft, has a reaction chamber (1) surrounded by a ring-shaped filter chamber (2). First gas exit openings (10 to 15) permit generated gas to flow from the reaction chamber into the filter chamber. Second gas exit openings (22) lead from the filter chamber into the inflatable article. A temperature responsive flow control is provided to make sure that the inflation efficiency or the inflation pressure inside the inflated article is substantially constant and substantially independent of the temperature of the gas generator at which the ignition of a gas generating fuel begins. For this purpose the total cross-sectional flow area of the first gas exit openings and/or the average gas flow path length between the first and second gas exit openings is controlled so that with a rising temperature the flow cross-sectional area and/or average path length is increased while the area and/or path length is decreased in response to a decreasing temperature.

12 Claims, 2 Drawing Sheets

GAS GENERATOR FOR INFLATING AN INFLATABLE ARTICLE

FIELD OF THE INVENTION

The invention relates to a gas generator for inflating an inflatable article such as a safety bag forming part of an impact protection system for persons in a vehicle or for inflating any other inflatable device such as a rubber raft.

BACKGROUND INFORMATION

Such gas generators conventionally comprise a reaction or combustion chamber in which the gas is generated and which is surrounded by a ring-shaped filter chamber. Flow openings are provided in the wall which separates the reaction or combustion chamber from the filter chamber. Further flow openings are provided in the filter chamber wall for permitting the generated and filtered gas to enter into the article or device, such as a so-called "air bag" in an impact protection system.

German Patent Publication (DE-AS) 2,915,202 discloses a gas generator of the above described type. It is desirable for such inflating devices, especially when an air bag for a safety system is to be inflated, that the inflating satisfies a certain efficiency. Stated differently, a safety air bag must be inflated to a certain degree or rather to a certain internal pressure within a defined inflating time. Additionally, the inflating time and the inflating pressure shall be as much as possible independent of the gas generator temperature at the time of ignition of the gas generating fuel. The gas generator temperature may be within the range of about $-40°$ C. to about $+85°$ C. However, conventional gas generators are noticeably dependent in their efficiency from the temperature to which they are exposed at the time of the ignition. As a result, the air safety bag is inflated, for example at a temperature of $-40°$ C., much slower and to a lesser inflation pressure than when the same generator is exposed to a higher temperature at the time of ignition.

On the other hand, the inflating characteristic or efficiency of the gas generator must also be satisfactory when the generator is exposed to a high temperature, for example, of $+85°$ C. In conventional gas generators the inflating time at high temperatures is respectively shorter and the inflating pressure of the safety bag is very high. As a result, the safety bag must be constructed to withstand the higher pressures when the inflating takes place with high gas generator temperatures. This makes the air bags relatively more expensive and such air bags become heavier. Still another undesirable characteristic of such air bags with a high inflated pressure resides in the fact that the intended cushioning effect may be substantially reduced.

Further, when the gas generating fuel is combusted, hot particles travel from the combustion chamber into the filter chamber where these particles are supposed to be filtered out of the inflating gas. The discharge of the hot particles from the reaction or combustion chamber into the filter chamber also depends on the temperature of the gas generator. In other words, at a high temperature of about $+85°$ C. a relatively large proportion of hot particles exits from the reaction chamber. As a result, the filter and the filter chamber must be constructed to meet the operating conditions at such high temperature. Such construction again makes the filter chamber and the filter itself more expensive.

OBJECTS OF THE INVENTION

In view of the above it is the aim of the invention to achieve the following objects singly or in combination:

to construct a gas generator of the type described above in which the inflating time and the inflating pressure of an inflating device such as an air safety bag are substantially independent of the gas generator temperature or the temperature to which the gas generator is exposed at the time of ignition;

to make sure that also the discharge of hot particles from the combustion chamber into the filter chamber is substantially independent of the gas generator temperature; and to vary the cross-sectional flow areas for the inflating gas and/or the length of the path through which the inflating gas must travel, in response to the gas generator temperature.

SUMMARY OF THE INVENTION

The above objects have been achieved according to the invention in a gas generator of the type described above, wherein the total cross-sectional flow area of the gas flow openings permitting a gas flow from the reaction chamber into the filter chamber and/or the average gas flow path length through which the generated gas must travel from the exit openings of the reaction chamber to the exit openings of the filter chamber are varied in response to the gas generator temperature. The control is such that with an increasing temperature the total cross-sectional flow area of the gas exit openings of the combustion chamber and/or the average flow path lengths are increased while the cross-sectional flow area and/or the path lengths are decreased in response to a dropping temperature.

According to the invention, preferably both controls are performed simultaneously, namely the cross-sectional flow area may be increased while the path length is increased or the flow cross-sectional area may be decreased while the path length is decreased. However, performing both controls simultaneously is not critical for achieving the objects of the invention. It is quite possible to perform but one of the two controls, namely the cross sectional flow area control, or the path lengths control. In both instances it is quite possible to make the time required for the inflating and the final inflated pressure substantially independent of the gas generator temperature and to also reduce the difference between the quantities of hot particles that are being ejected from the combustion chamber at high temperatures and at low temperatures.

BRIEF DESCRIPTION OF THE DRAWINGS

In order that the invention may be clearly understood, it will now be described, by way of example, with reference to the accompanying drawings, wherein.

Figure 1:
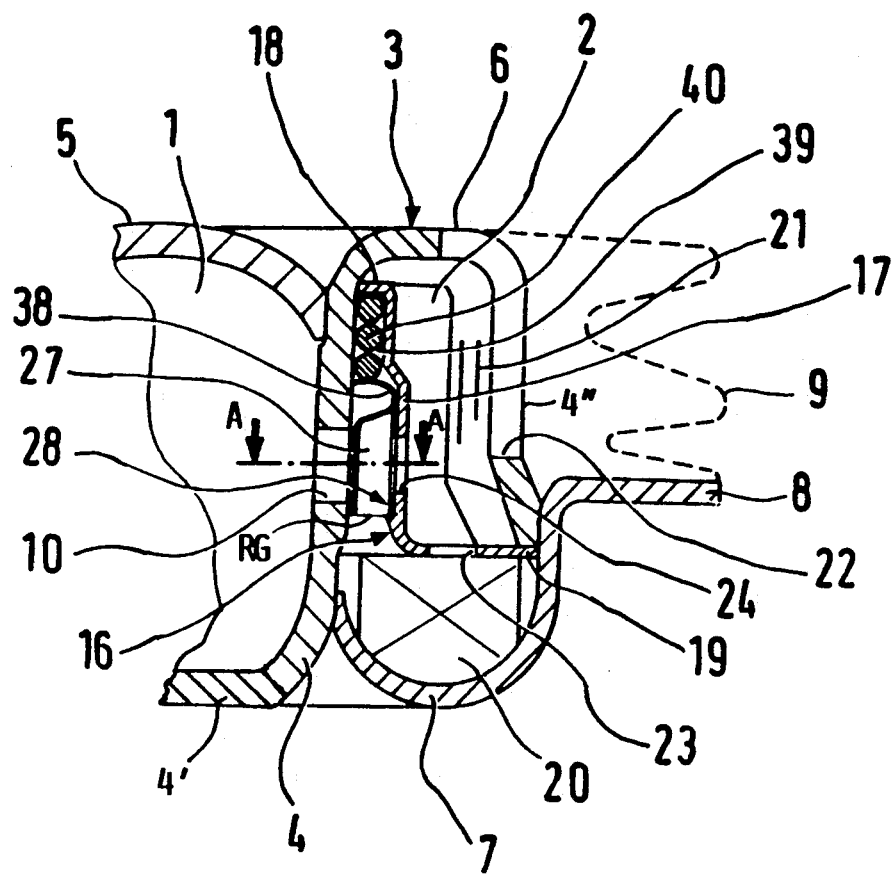
FIG. 1 is a cross-sectional view through a broken-away portion of a gas generator according to the invention.

DETAILED DESCRIPTION OF PREFERRED EXAMPLE EMBODIMENTS AND OF THE BEST MODE OF THE INVENTION

The gas generator comprises a reaction chamber 1 having, for example, a cylindrical or toroidal configuration. The reaction chamber 1 is filled with a gas generating fuel not shown. The fuel is ignited by an ignition device also not shown, but of conventional construction. The ignition device is located for example coaxially with the central axis of the reaction chamber. The ignition signal is generated by an impact sensor not part of the invention. The reaction or combustion chamber 1 is concentrically surrounded by a filter chamber 2 also having a toroidal or ring-shaped configuration.

The housing of the reaction chamber 1 and the housing for the filter chamber 2 comprise a common housing shell 3 having a radially inner wall 4 which forms a dividing wall between the combustion chamber 1 and the filter chamber 2. Additionally, the housing shell 3 has a bottom 4' which closes the combustion chamber 1, and a radially outer rim wall 4" which faces an inflatable article such as a safety air bag 9 shown by a dashed line. The filter chamber 2 is formed between the radially inner wall 4 and the outer rim wall 4". The top of the combustion chamber 1 is closed by a cover 5. The top of the filter chamber 2 is closed by a shell section 6 interconnecting the inner wall 4 with the outer rim wall 4". Such a housing construction corresponds to that disclosed in the above mentioned German Patent Publication (DE-AS) 2,915202. The bottom 4', the wall 4, and the shell section 6 form an approximate S-configuration in the cross-sectional view. The wall 4, the shell section 6, and the rim wall 4" form substantially an inverted U-configuration in the sectional view. The downwardly facing end of the filter chamber 2 is closed by a sheet metal ring element 7 having a radially outwardly extending ring flange 8 which is used for mounting the gas generator.

As shown in FIG. 1, the article to be inflated such as an air safety bag 9 is arranged in a bellows type folding that surrounds one side of the gas generator. The safety bag 9 covers the upwardly facing surfaces of the gas generator including the radial flange 8. This arrangement is suitable for installation in the steering wheel of a motor vehicle, especially a passenger car. However, the invention is not limited to this particular type of use. Rather, the present gas generator is generally suitable for generating pressurized inflating gas, for example, for inflating life rafts or the like.

First, gas exit openings 10, 11, 12, 13, 14, and 15 are provided in the housing wall 4 to permit generated gas to flow from the combustion chamber 1 into the filter chamber 2. Second gas exit openings 22 are provided in the housing rim wall 4" to permit filtered gas to exit from the filter chamber 2 into the air bag 9.

A deflection baffle or flow guide 16 is arranged in the filter chamber 2 to concentrically surround the combustion chamber 1. The baffle 16 has an upper radially inwardly extending flange 18 dimensioned to provide an upper ring space 39 between the wall 4 and the upper portion of the wall 17 of the baffle 16. The wall 17 of the baffle 16 is substantially cylindrical and may have an upper section with a smaller diameter and a lower section with a somewhat larger diameter. The two sections are interconnected by a slanted step. The lower section of the cylindrical wall 17 of the baffle 16 encloses a lower ring space 27 between the wall 4 and the wall 17.

The baffle 16 further has a lower radially outwardly directed flange 19 connected to the downwardly facing edge of the rim wall 4".

The cover sheet metal member 7 and the flange 19 form a lower portion of the filter chamber 2. The lower filter chamber portion communicates with the lower ring space 27 through a ring gap RG. Additionally, the lower filter chamber portion communicates with the upper portion of the filter chamber 2 through holes 23 in the flange 19. A first ring shaped filter body 20 is located in the lower filter chamber portion. A section filter 21 is located in the upper portion of the filter chamber between the main section 17 of the baffle 16 and the outer rim wall 4" of the housing. The baffle 16 is provided with flow ports 24, 25, and 26 in its main section 17. Thus, the generated gas can follow a shorter flow path through the first exit openings 10 to 15, through the flow ports 24, 25, 26, and out through the second exit openings 22. Alternatively, the generated gas can take a longer path through the exit openings 10 to 15, the ring gap RG, the first filter 20, the holes 23, the second filter 21, and out through the second flow openings 22. The conditions under which the generated gas will take one or the other path depend on the temperature responsive control according to the invention to be described below.

Figure 2:
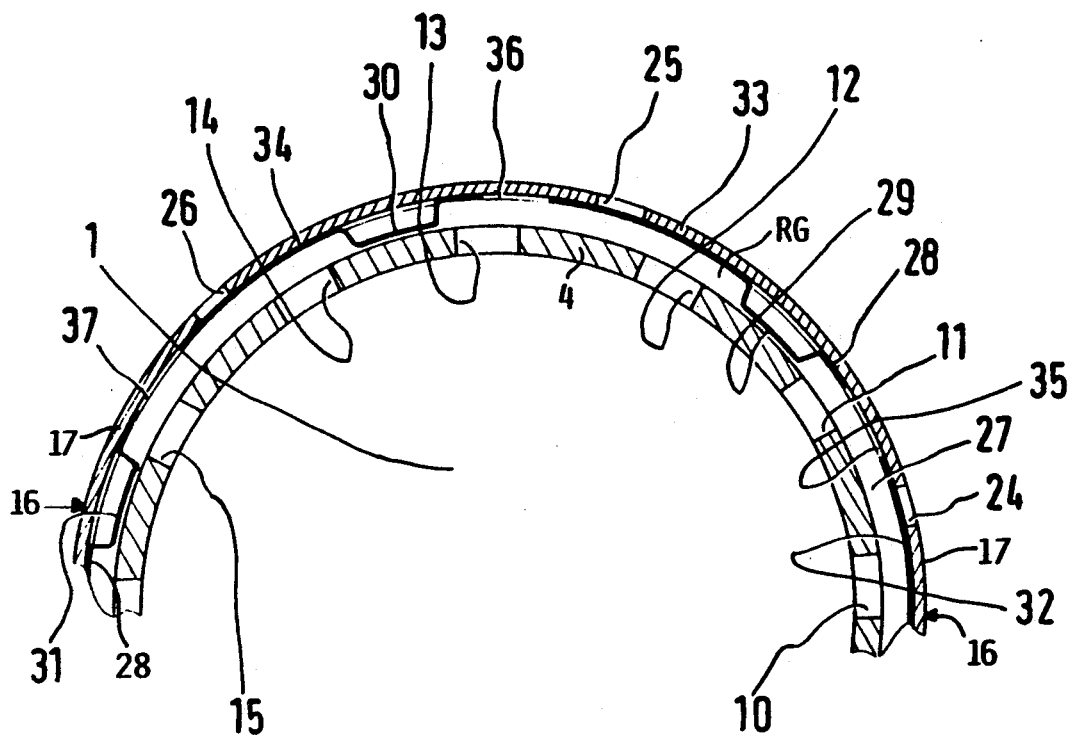
FIG. 2 shows a sectional view along section line A—A in FIG. 1, illustrating the gas generator and its flow control at a relatively hot temperature.

The temperature responsive flow control means according to the invention, comprise a ring slide 28 located in the ring space 27 between the wall 4 and the main section 17 of the baffle 16 where the gas exit openings 10 to 15 and the flow ports 24 to 26 are located. The ring slide 28 functions as a valve. For this purpose, the ring slide 28 is rotatably supported for movement back and forth around the housing wall 4. The slide 28 is constructed as a cylinder of a corrugated type sheet metal. The corrugations comprise radially inwardly directed ridges 29, 30, 31 which form closing sections cooperating with at least certain first gas exit openings 10 to 15 in the housing wall 4. The slide 28 has further circumferentially wider corrugations which form radially outwardly facing wall sections 32, 33, and 34 provided with holes 35, 36, and 37 for cooperation with the flow ports 24, 25, and 26 in the baffle 16. The slide 28 is so constructed that the radially inwardly directed ridges 29, 30, and 31 slide along the radially outwardly directed surface of the housing wall 4 while the radially outwardly directed sections 32, 33, and 34 slide along the radially inwardly facing cylindrical surface of the main section 17 of the baffle 16. Thus, the ridges 29, 30, and 31 cooperate with at least some of the gas exit openings 10 to 15 while the flow port closing wall sections 32, 33, and 34 cooperate with the flow ports 24, 25, and 26 in the main section 17 of the baffle 16. In FIG. 2, the wall sections 32, 33, and 34 close the flow ports 24, 25, and 26 while in FIG. 3 the holes 35, 36, and 37 are aligned with the flow ports 24, 25 and 26 respectively, to permit a direct flow from the combustion chamber 1 into the upper portion of the filter chamber 2. The holes 35, 36, and 37 in the wall sections 32, 33, and 34 of the slide 28 may be stamped into the sheet metal of which the slide 28 is made. Further, the upward edge of the slide 28 is formed as a shoulder 38 best seen in FIG. 1. The shoulder 38 closes the ring space 39 formed, as mentioned above, between the flange 1 and the shoulder 38 on the one hand and between the wall 4 and the cylindrical section 17 of the baffle 16.

According to the invention the temperature responsive control means further comprise a drive member 40 which is changing its physical characteristic, for example, its length, in response to temperature changes. The member 40 comprises, for example, a rod of a material having a high heat expansion coefficient. The rod 40 is, for example, wound into a coil having three windings located in the upper ring space 39. One end of the drive member 40 is connected to the upper shoulder 38 of the slide 28 while the other end of the coil is secured either to the inner wall 4 of the housing or to the baffle 16, in any event to a fixed point.

The temperature responsive drive member 40, due to its high heat expansion coefficient, shortens its length in response to a temperature drop while it lengthens in response to a temperature rise. Thus, the slide 28 is driven to slide around the housing wall 4 in one or the other direction for moving the closing sections 29, 30, and 31 relative to the gas exit openings 11, 13, and 15 while moving the flow port closing wall sections 32, 33, and 34 relative to the flow ports 24, 25, and 26 in accordance with or in response to the respective temperature conditions which are present in the generator at the time the gas generating fuel is ignited in the reaction chamber 1.

The slide 28 is properly guided in the ring space 27 by the wall 4 and the baffle 16. Additionally, the wall 4 protects the temperature responsive drive member 40 against the influence of the hot inflating gas and against the hot particles carried by this gas. The temperature responsive drive member 40 is, for example, made of a polyethylene rod wound into the above mentioned coil. In the downward direction the slide 28 is supported by a shoulder of the baffle 16. The slide 28 cooperates with the first gas exit openings 10 to 15 in response to temperature in such a way that at a given maximum temperature of, for example +85° C., all first gas exit openings 10 to 15 will be unobstructed, thereby providing the largest cross-sectional flow area at this maximum temperature. At this time, the closure sections 29, 30, and 31 are located outside the respective openings 11, 13, and 15 as shown in FIG. 2, representing the high temperature operational state of the slide 28. On the other hand, FIG. 3 shows the low temperature operational state of the slide 28 in which the closing ridges or sections 29, 30, and 31 close off the exit openings 11, 13, and 15 so that the cross-sectional flow area is reduced by 50%.

As a result of the just described operation of the slide 28 in response to temperature, more specifically, when ignition begins in a gas generator chamber at a low temperature, the closing of half of the exit openings 10 to 15 results in the build-up of a higher pressure in the chamber 1 as compared to the situation when all the openings 10 to 15 would be open and the temperature would be equally low at the beginning of the ignition. Due to this pressure increase, the combustion in the reaction chamber 1 is accelerated so that the inflating time of the safety air bag 9 is reduced and hotter inflating gas, in other words, a larger inflating gas volume, is supplied into the bag 9 as compared to the gas generator in which the gas exit openings have a constant total cross-sectional flow area independently of the temperature.

Figure 3:
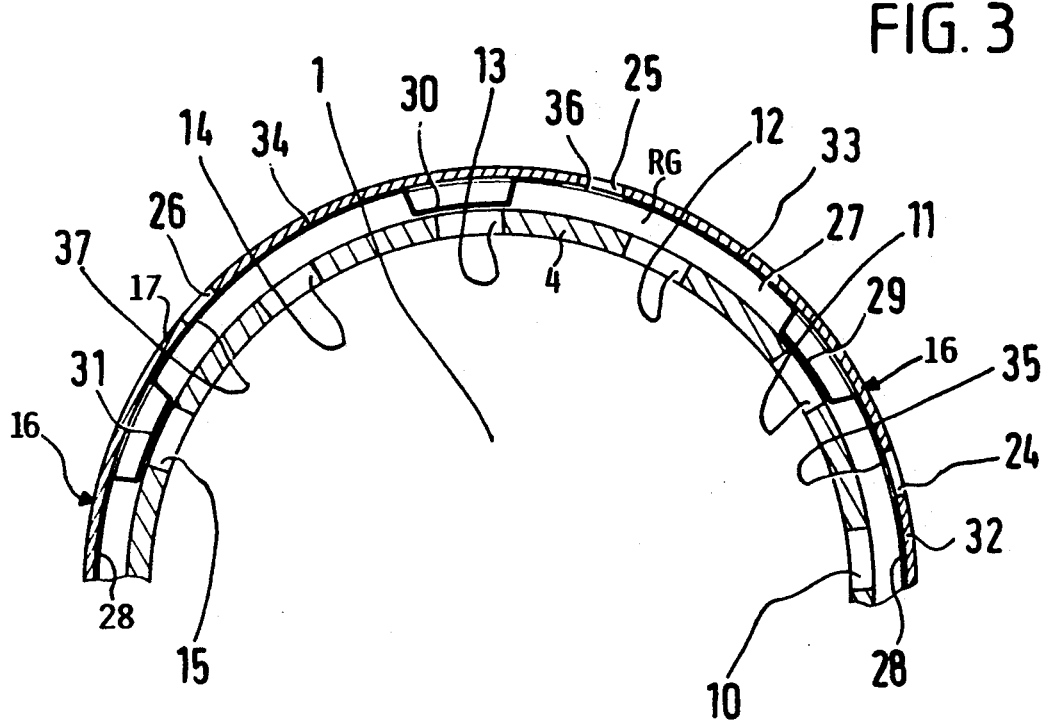
FIG. 3 is a sectional view similar to that of FIG. 2, but showing the flow control at a relatively cold temperature.

Simultaneously with the decrease in the cross-sectional flow area by the closing of the gas exit openings 11, 13, and 15 as shown in FIG. 3 at the cold state of the combustion chamber 1, the average gas flow path length is also reduced or shortened in the cold state of the generator. As shown in FIG. 3, gases passing through the openings 10, 12, and 14 can flow through the gas flow ports 24, 25, and 26 so that they do not have to pass through the ring gap RG and through the first filter 20. For this purpose the slide 28 as shown in FIG. 3 is so positioned that the holes 35, 36, and 37 are located to register with the gas flow ports 24, 25, and 26 respectively to open up the above mentioned shorter flow path length. Thus, the gas flow is directly into the second filter 21 and out through the section gas exit openings 22, thereby bypassing the first filter 20. On the other hand, when the generator is at a higher temperature, at the beginning of the fuel ignition, the slide 28 is in the position shown in FIG. 2 in which the flow ports 24, 25, and 26 are closed, thereby increasing the average gas flow path length since now the gas must travel through the ring gap RG, the filter 20, the holes 23, the filter 21, and out through the second gas exit openings 22.

In view of the above, the invention achieves a filling efficiency for the safety bag 9 which is substantially independent of the temperature of the generator at the time the gas generating fuel is ignited. This is so because when the gas generator is cold, the generated gas flows relatively uncooled, that is, with a higher temperature and hence with a correspondingly higher volume into the bag 9 along the shorter flow path as illustrated in FIG. 3, thereby increasing the filling efficiency.

On the other hand, when the fuel ignition takes place at a given maximum temperature of, for example +85° C., the operational state of the slide 28 as shown in FIG. 2 makes sure that the gas must follow the longer path as described above, whereby the gas is relatively cooled down. By keeping all first gas exit openings 10 to 15 open as shown in FIG. 2, the pressure in the reaction chamber 1 is respectively reduced. As a result, the temperature of the inflating gas is also reduced along with the pressure in the bag 9 so that the inflating time is also reduced along with the quantity of hot particles travelling out of the reaction or combustion chamber 1 with the generated gas. The result is a normally inflated bag that does not become too hard.

Although it is preferred to make the slide 28 of sheet steel, other materials may be used for making the slide 28, for example, polytetrafluoroethylene, or cast aluminum may be used.

It is advantageous that the closure sections 29, 30, and 31 as well as the openings or holes 35, 36, and 37 have rectangular configurations with straight edges. This feature assures that a relatively linear control of the entire cross-sectional flow area through the openings 10 to 15 and/or of the average length of the flow path is achieved as a function of temperature changes. For the same reason, the cross-sectional flow areas of the first gas exit openings 10 to 15 and/or the respective cross-sectional flow areas of the flow ports 24 to 26 in the baffle 16 could also have a rectangular configuration.

Although the invention has been described with reference to specific example embodiments it will be appreciated that it is intended to cover all modifications and equivalents within the scope of the appended claims.

What we claim is:

1. A gas generator for inflating an inflatable article, comprising a housing, a reaction chamber in said housing for generating gas, a filter chamber arranged for receiving gas from said reaction chamber, first gas exit opening means (10 to 15) in said reaction chamber for a gas flow from said reaction chamber into said filter chamber, second gas exit opening means (22) in said filter chamber for a gas flow from said filter chamber into said inflatable article, temperature responsive flow control means arranged in said gas generator for influencing a gas flow from said reaction chamber into said inflatable article in such a way that an inflation duration and an inflation pressure are substantially independent of a gas generator temperature, and wherein said reaction chamber (4) has a circular cross-section, wherein said filter chamber has a ring configuration surrounding said reaction chamber, said temperature responsive flow control means comprising a baffle ring (16) extending around said reaction chamber with a radial spacing for guiding a flow of generated gas, a ring slide (28) rotatably surrounding said reaction chamber in said radial spacing, said a temperature responsive drive member (40) connected to said ring slide for driving said ring slide (28) between closing and opening positions in response to temperature changes, said baffle ring (28) having flow ports (24, 25, 26) therein, said ring slide (28) having flow port closing wall sections (32 to 34) for cooperation with said flow ports (24, 25, 26) of said baffle ring (16), said temperature responsive drive member (40) driving said ring slide (28) to close said flow ports (24, 25, 26) in said baffle ring in response to a higher gas generator temperature and to open said flow ports (24, 25, 26) in said baffle ring in response to a lower gas generator temperature.

2. The gas generator of claim 1, wherein said temperature responsive flow control means are arranged to cooperate with said first gas exit opening means (10 to 15) in said reaction chamber for increasing their cross-sectional flow area in response to a rising of said gas generator temperature and for decreasing said cross-sectional flow area in response to a dropping of said gas generator temperature.

3. The gas generator of claim 1, wherein said temperature responsive flow control means are arranged to cooperate with said filter chamber for increasing a flow path length through said filter chamber in response to a rising of said gas generator temperature and for decreasing said flow path length in response to a dropping of said gas generator temperature.

4. The gas generator of claim 1, wherein said ring slide (28) comprises, in addition to said flow port closing sections (32 to 34), further closing sections (29 to 31) for reducing the total flow cross-sectional area of said first gas exit openings (10 to 15) of said reaction chamber, wherein said temperature responsive drive member (40) drives said ring slide (28) with its closing sections (29 to 34) in such a way, that said first gas exit openings (10 to 15) are all opened while said flow ports (24 to 26) in said baffle ring (16) are all closed in response to a rising temperature, thereby increasing the cross-sectional flow area through said first gas exit openings (10 to 15) and also increasing the average flow path length through said filter chamber (2) at a given high temperature, said temperature responsive drive member (40) further driving said ring slide (28) with its closing sections (29 to 34) so, that at least certain of said first gas exit openings (10 to 15) are closed while said flow ports (24 to 26) in said baffle ring are opened in response to a dropping temperature, thereby decreasing the cross-sectional flow area through said first gas exit openings (10 to 15) and also decreasing the average flow path length through said filter chamber (2) at a given low temperature.

5. The gas generator of claim 4, wherein said ring slide (28) comprises a cylinder structure having said flow port closing sections (32 to 34) in the form of cylinder wall sections contacting said baffle ring (16) in a slideable manner, said flow port closing sections having holes (35 to 37) therein for cooperation with said flow ports (24, 25, 26) in said baffle ring (16), said further closing sections (29 to 31) forming radially inwardly projecting ridges of said cylinder structure for cooperating with said first gas exit openings (10 to 15).

6. The gas generator of claim 5, wherein said flow port closing sections (32 to 34) of said cylinder structure and said further closing sections (29 to 31) of said cylinder structure alternate with each other in a circumferential direction of said cylinder structure, thereby forming a corrugated-type cross-sectional configuration of said cylinder structure.

7. The gas generator of claim 1, wherein said temperature responsive means comprise a slide valve member (28) and a temperature responsive drive member (40) having one end connected to said slide valve member and another end connected to a fixed point in said gas generator, said drive member having a high temperature expansion coefficient for changing its length in response to temperature changes for driving said slide valve member.

8. The gas generator of claim 7, wherein said reaction chamber has a cylindrical wall (4), said temperature responsive drive member comprising a rod wound into a coil surrounding said cylindrical wall of said reaction chamber.

9. The gas generator of claim 8, further comprising a baffle (16) surrounding said cylindrical wall with a spacing to form a ring space (39) between said baffle and said cylindrical wall, said coil (40) of said drive member being located in said ring space (39).

10. The gas generator of claim 9, wherein said slide valve member (28) comprises a ring having a ring shoulder (38) facing and closing said ring space (39) at one end thereof, said baffle (16) having a radially inwardly directed flange (18) closing said ring space at the other end thereof.

11. A gas generator for inflating an inflatable article, comprising a housing, a reaction chamber in said housing for generating gas, a filter chamber arranged for receiving gas from said reaction chamber, first gas exit opening means (10 to 15) in said reaction chamber for a gas flow from said reaction chamber into said filter chamber, second gas exit opening means (22) in said filter chamber for a gas flow from said filter chamber into said inflatable article, temperature responsive flow control means arranged in said gas generator for influencing a gas flow from said reaction chamber into said inflatable article in such a way that an inflation duration and an inflation pressure are substantially independent of a gas generator temperature, and wherein said temperature responsive flow control means are arranged to cooperate with said filter chamber for increasing a flow path length through said filter chamber in response to a rising of said gas generator temperature and for decreasing said flow path length in response to a dropping of said gas generator temperature.

12. The gas generator of claim 11, wherein said reaction chamber has a circular cross-section, wherein said filter chamber has a ring configuration surrounding said reaction chamber, wherein said temperature responsive flow control means comprise a ring slide (28) rotatably surrounding said reaction chamber and a temperature responsive drive member (40) connected to said ring slide for driving said ring slide between closing and opening positions in response to temperature changes, said ring slide having gas exit opening closing sections (29 to 31) for cooperation with said first gas exit opening means (10 to 15) of said reaction chamber to close said first gas exit opening means at least partially when said ring slide (28) is in said closing position in response to a lower gas generator temperature, and to open said first gas exit opening means when ring slide is in said opening position in response to a higher gas generator temperature.

* * * * *

UNITED STATES PATENT AND TRADEMARK OFFICE
CERTIFICATE OF CORRECTION

PATENT NO. : 5,003,887
DATED : April 2, 1991
INVENTOR(S) : Karl Unterforsthuber et al.

It is certified that error appears in the above-identified patent and that said Letters Patent is hereby corrected as shown below:

In Claim 1, Column 7, line 15, replace "said" by --and--;

In Claim 12, Column 10, line 2, after "when" insert --said--.

Signed and Sealed this

Fourth Day of August, 1992

Attest:

DOUGLAS B. COMER

*Attesting Officer*        *Acting Commissioner of Patents and Trademarks*